Patented June 2, 1942

2,285,098

UNITED STATES PATENT OFFICE 2,285,098

METHOD OF MAKING FIBER PLASTER PRODUCTS

Eugene P. Schoch and William A. Cunningham, Austin, Tex.

No Drawing. Application March 7, 1941, Serial No. 382,234

8 Claims. (Cl. 18—48)

This invention relates to wallboard and other precast or factory-cast structural units made from gypsum plaster. Specifically, it relates to wallboard and other structural units which have properties superior to those of similar materials now being manufactured, and to a method of making these gypsum plaster products which is more efficient than those heretofore proposed. This application constitutes a continuation-in-part of our application Serial No. 173,532 filed November 8, 1937.

For many years the gypsum plaster industry has been attempting to make precast or factory-cast structural units which could be produced in standard shapes and sizes and which could be erected on the job by the usual type of labor commonly employed [See Industrial & Engineering Chemistry, vol. 27, page 1017 (1935)]. The gypsum plaster slabs used in the suspension type of precast roof construction were introduced in 1917. These slabs are about two inches thick and are usually composed of an admixture of gypsum plaster with 1% to 3% hair, fiber, sawdust, or similar materials. Such products have relatively small unit strengths and are so fragile that they must be handled with great care in order to prevent damage.

Another such precast unit is gypsum wallboard, many designs of which are now on the market. This wallboard or plaster board consists of a gypsum plaster core placed between two facing layers of heavy paper. Sawdust or pulped newspapers are frequently mixed with the gypsum to produce a lighter board and to reduce the tendency of the core to crack and shatter when nails are driven into it. Such a wallboard leaves much to be desired in its physical properties. Its strength, which is not great enough to take any appreciable bearing load, is, to a large extent, in the paper facing. The paper has a considerable tendency to change in moisture content, and hence tends to expand or shrink. The paper is not a good surface to which to apply paint. Numerous attempts have been made to improve such a wallboard, but these attempts have met with no great success.

Many attempts have been made to produce a superior wallboard or structural unit by incorporating various amounts of hair, wood shavings, wood chips, vegetable fibers, etc. in the plaster, and numerous patents have been granted in which the use of special fibers, or of special methods of treating the fibers, were disclosed. Further, in order to overcome the inherent weakness of structural gypsum products, such objects are now being manufactured in which are incorporated metal reinforcings of various designs, [See Ind. & Eng. Chem. vol. 27, page 1017-1018 (1935)] but obviously such products are seriously handicapped by the fact that they cannot be shaped and sawed readily. Hence the number of units of different shape and size that must be manufactured and kept in stock is materially increased.

It has long been realized that a gypsum plaster wallboard and other structural units possessing high structural strength and other properties required for wall construction, but which are free from the objectionable features above discussed, are greatly needed. Probably the desire to produce these products has been the motive behind the experimental work which preceded each of the following patents. Undoubtedly, much more work has been done which has not resulted in patents or publications.

Vogelsong, U. S. Patent 1,066,867, July 8, 1913 disclosed the use of a wetted wood fiber or paper scrap mixed with plaster and cement to make a plaster board composition.

Lockhart, U. S. Patent 1,423,569, July 25, 1922 disclosed the use of wood fibers in a plaster board which was rough on one side to provide an effective bond for the application of plaster or stucco.

Dykerhoff, U. S. Patent 1,446,888, August 19, 1922 disclosed the use of sawdust, wood shavings, wood chips, damp moor peat, etc. which have been subjected to dry heat at 120° C. in order to make them water-resistant and non-hygroscopic.

McAllister, U. S. Patent 1,463,123, July 24, 1924 disclosed the use of well saturated wood pulp, sawdust, or ground paper in a wallboard composed of definite quantities of wood pulp, siliceous material, cement, plaster of Paris, and other ingredients.

Haggerty, U. S. Patents 1,702,965 and 1,702,966, both granted February 19, 1929 disclosed the use of wood fibers, such as those obtained by pulping or beating old newspapers in a water suspension, in the manufacture of a paper-backed wallboard. Haggerty's patents, like that of McAllister, are based primarily on the use of a fiber which is well saturated with water before it is mixed with the plaster. Vogelsong's patent (supra) also states that it is advantageous to wet the fiber prior to mixing it with the plaster.

Freret, U. S. Patent 1,762,267, June 10, 1930 claims that it is advantageous to precoat the wood or asbestos fibers with a material of more or less rigid and impervious nature before mixing it with the cementitious binding agent.

Ruby, U. S. Patent 1,799,324, April 7, 1931 disclosed the use of cotton fibers with plaster of Paris to form a structural product.

McMillan, U. S. Patent 1,907,080, May 2, 1933 disclosed the method of preparation of a fibrous composition in which the cementitious material is rolled, kneaded, and pressed into the fibrous material.

Roos, U. S. Patent 2,007,133, July 2, 1935 disclosed a method of making a fibered wallboard whereby the mixture of fiber and plaster is wetted and then subjected to a quiescent soaking for a predetermined period of time.

Neervoort, British Patent 396,652, August 10, 1933, disclosed the use of three parts bagasse fiber and one part of an hydraulic binder to form a weatherproof brick or building element.

The present invention is directed to the production of a reinforced plaster board which overcomes many undesirable characteristics found in similar boards made according to prior known processes, including those referred to above. Among such undesirable characteristics may be mentioned the necessity of a paper liner or facing applied as a surface of the finished board to strengthen the same, the necessity for the formation of structural units in undesirable thickness from two to four inches, expensive metallic reinforcements in structural units, and others too apparent to mention. A board or structural unit produced as hereinafter disclosed will overcome these defects and therefore fill a great need for a strong, cheaply made product in the wall board or plaster-board industry.

So far as we have been able to find out, no gypsum plaster product containing as much as 5% of any type of fibrous filler has other than a very limited market. Two outstanding factors are responsible for this condition: (1) the lack of a cheap, high strength gypsum plaster, and (2) failure to combine satisfactorily the plaster with a suitable cheap fibrous material. True, high strength plasters are now being produced, but they are more expensive than the standard calcined plasters. Many fibers have been used, and various processes have been proposed for treatment of the fibers, but none is known to us as being highly successful. Products made in accordance with the patents of Haggerty above mentioned have met with fair success, but his process involves the use of very short wood fibers obtained by beating or pulping old newspapers in an aqueous suspension, and even the Haggerty product requires the use of reinforcing paper covers.

We have now discovered how to make a product consisting of a set mass made from a high-strength gypsum plaster in which a stiff fiber is incorporated, which set mass is superior in several properties to any that has heretofore been disclosed. In investigating the possibility of making pre-cast wallboard, tile, and other structural forms from the high-strength gypsum plaster made according to Schoch, U. S. Patent 1,989,712, February 5, 1935, we have found that the admixture of substantial amounts of a stiff, "bristle-like" fiber with the plaster produces, when mixed with the requisite amount of water, a set mass which has very unusual and unexpected properties. For example, the set mass is highly resistant to shock; has none of the brittleness characteristic of the set mass resulting when no fibrous matter is added to a high-strength gypsum plaster. The mixture is so resilient that a nail may be driven into it without the formation of even incipient cracks on the surface. At the same time, that surface of the set mass, which was set in contact with the mold, has all the hardness and smoothness which is characteristic of the set mass when the neat plaster is mixed with water. In other words, in our new product there are combined the hardness and the smooth surface of the plaster with the resiliency and fibrous properties of wood. Since the high-strength plaster when set up with water and without the admixture of a fibrous material produces a much harder and more brittle product than does ordinary calcined plaster, the extreme resiliency and non-shattering qualities of the high-strength plaster-fiber admixture are all the more remarkable. Fibers obtained from corn stalks, cotton stalks, yucca, cacti, etc. might well be used, but we prefer the stiff bristle-like fiber which is obtained by passing dry crude bagasse through a hammer mill and screening out the pithy material separated by the mill.

The use of small quantities of hair (ordinarily 1½ to 3 pounds per ton of plaster, but sometimes proposed to be as much as 5%) has long been known to the plaster industry. We have incorporated much larger amounts of fibrous matter in our product; amounts of from 6% to 15% by weight are most advantageous. In the prior known use of fiber or hair the properties of the set mixtures have not been so materially different (i. e. from those of the unfibered plaster) that they have met with great commercial success. In our product the fiber is a very essential part of the material; its incorporation produces a set mass having unforeseen properties which are radically different from those of either the fiber or the unfibered set plaster. The fiber is not merely an inert filler, like sand, but actually serves as a reinforcing binder, even though not continuous, within the mass.

The manner of mixing the fiber with the plaster makes no great difference in the properties of the set mass. The fiber may be added either wet or dry, though we prefer to add it dry and then to add sufficient tempering water to wet the fiber and set the plaster at the same time. The fiber may be mixed with the dry plaster prior to the addition of the tempering water, but it is preferable to mix the water with the plaster first and then to add the fiber; more water may then be added if necessary to produce a mixture easy to handle mechanically. The mixture of fiber, plaster and water is then placed in a mold of the desired shape and allowed to set.

During the experimental work in the development of this product we have tried many different kinds of fibers and a number of different kinds and grades of gypsum plasters. We have found that a so-called "high-strength" plaster is essential if a superior type of board or structural unit is to be produced. We prefer to use plaster made according to the process described in the Schoch U. S. Patent 1,989,712, but do not propose to be limited to the use of this particular plaster. The fibers used should have stiff, "bristle-like" characteristics and, preferably, should be about 1 inch to 1½ inches in length. Stiff fibers do not have any tendency to mat or ball up, while soft pliable fibers do mat up. The fiber or plaster, or both, may be colored if a more decorative material is desired.

The plaster disclosed in the Schoch patent (supra) is produced by "cooking" gypsum in a concentrated magnesium sulfate solution at a temperature of 105–107° C., separating the resultant plaster from the solution by filtering or centrifuging, washing the plaster to remove the soluble salts, and then drying the plaster. In adapting this patented process to the manufacture of pre-cast fibered products, we prefer to mix the fiber with the well-washed damp plaster from the filters or centrifugals, to add water to the mixture of plaster and fiber as desired, and to cast directly into the molds. By this procedure the drying of the plaster can be eliminated, thus materially decreasing the cost of the fibered products.

The hydration or setting of calcium sulfate hemihydrate is a chemical reaction which is thermodynamically possible at temperatures below 100° C. However, the rate of hydration or setting is dependent upon the temperature. At normal or room temperature the setting time of uncontaminated plaster will range from seven to fifteen minutes after the dry plaster is mixed with water. Theoretical studies of the relationship near 100° C. have been rendered difficult by the fact that several weeks are required for the system to reach equilibrium. At intermediate temperatures the time required for hydration is somewhere between the two extremes.

Hence, there is no critical temperature, and our damp filter residue (plaster) need not necessarily be maintained at or above 100° C. in order to prevent it from setting during the time required to add the fiber and to cast the mixture of plaster and fiber into the molds; it need be held only at a temperature sufficiently high to prevent its seting prior to its placement in the molds. We have found in our continuous process that a relatively considerable loss of temperature, from the 105° C. cooking temperature, will still permit the filtering, washing, and fiber adding steps to be carried out successfully prior to the molding. However, from our tests it appeared that the temperature should not fall to any extent below 80° C. in order to give ample time to carry out these steps (either with or without the addition of the fiber, but including the molding), but this temperature is not to be considered critical but rather an economical and practical temperature which is relatively easy to maintain in commercial operation.

Thus, it is to be understood that in the broadest aspect our process comprises forming a mixture of plaster (however produced) and water of such a temperature that the wet plaster-water slurry has a temperature sufficiently high to prevent its setting during the subsequent casting, forming or shaping operations to produce the desired plaster product; filler or fibrous material may or may not be added to the slurry according to whether or not the ultimate plaster product is desired reinforced, but if it is added then such addition is made while maintaining the temperature of the slurry sufficiently high to prevent setting of the fibered plaster mass prior to the shaping or molding operation; the hot slurry with or without the filler or fibrous material is then cast or formed in accordance with the desired shape of the plaster product; and then the resultant cast or formed product is permitted to cool so as to set into a hard mass. Since the time required to form the hot slurry into the desired shape varies with the complexity of the plaster product, and since the retardation of the time of setting can be controlled by controlling the temperature, it is obvious that there is no "critical" temperature which is applicable to all conditions. Hence the only requirement is that the temperature of the slurry or slurry-fiber mixture be sufficiently high to prevent the same from setting before it is placed in the desired shape, form, or mold; by adhering to this requirement of high temperature, there is no necessity for adding any retarder to the plaster in this process.

More specifically, our continuous process comprises cooking gypsum in a concentrated magnesium sulfate solution, filtering and washing the resultant plaster from the solution to remove the soluble salts, adding fiber or not as desired to the thus produced damp plaster, and molding the fibered mass into desired shapes, the plaster during said filtering, washing, and addition of the fiber being maintained at a temperature sufficiently high to prevent its setting prior to the molding thereof. The cooking is carried on at a temperature of approximately 105–107° C.; the filtering, washing, and fiber addition steps are accomplished while maintaining the plaster slurry at or above a temperature of 80° C.; the molding comprises casting the hot slurry (fibered or unfibered) into molds as well as flowing such slurry onto plaster-board-forming machines; and the continuous process is conducted without drying the plaster at any time prior to the casting and/or molding operation. The formed, shaped, or molded mass is permitted to cool in order to set into the desired plaster product.

Among the advantages of such a procedure, as above described, may be listed the following. (1) No retarder need be added to the plaster nor to the slurry to prevent it from seting too rapidly. It is well known by those skilled in the art that a set-retarder tends to decrease the ultimate strength of the cast product, wherefore those products whose setting time has been controlled by temperature alone will tend to be stronger than those to which an artificial retarder has been added to control the setting time. (2) In order to make a plaster slurry of a consistency which will permit it to be formed or poured into molds, it is necessary to add from two to three times the amount of water theoretically required to combine with the hemi-hydrate to make it set. The removal of this extra water not only leaves voids in the set mass, and thus makes it less dense and hence weaker, but also requires the application of heat to evaporate the water. Casts which have been formed of hot slurry (fibered or unfibered) in the absence of an artificial retarder may be subjected to a partial vacuum immediately after pouring. Such a procedure will permit a utilization of the heat in the hot slurry to evaporate some of the extra water, and thus render the product less porous and also stronger, and at the same time will cool the product to a temperature sufficiently low to cause it to set. This double effect will make for economy of operation. (3) When plaster sets it evolves a considerable amount of heat. When hot-cast products are cooled under partial vacuum as suggested above, this heat evolved upon hydration is utilized to evaporate more of the extraneous water. This also will tend toward more economical operation, since less additional heat will be required to evaporate the excess water in the set mass.

Tensile strength test briquettes, in which 5% or more of the stiff fiber is incorporated, show a "stretch" or resiliency not possessed by unfibered or even lightly fibered plaster. This "stretch"

first appears at unit stresses of from 125 to 175 pounds per square inch lower than those required for rupture. At the point of rupture the break is not sharp and distinct, as it is with ordinary plaster or cement briquettes, but is more nearly a tear such as is noticed when wood is ruptured by the application of a tensile stress. Even after a surface break appears and the test piece fails, the strength of the fibers and the bond between them and the plaster is frequently so great that a force of approximately 100 pounds per square inch is required to tear the pieces completely apart.

The following tensile strengths are typical:

| Briquette number— | Stress at initial yield point | Stress at rupture point |
|---|---|---|
| | Lbs./sq. in. | Lbs./sq. in. |
| 1 | 175 | 350 |
| 2 | 225 | 350 |
| 3 | 180 | 330 |
| 4 | 190 | 330 |
| Average | 192.5 | 340 |

Briquettes were made by mixing 500 grams plaster (Schoch process, supra) with 250 ml. water into a slurry, mixing 50 grams stiff fiber into the slurry and casting into standard molds. They were allowed to stand in the laboratory for seven days, and were broken at the end of that period in a standard Riehle testing machine.

Compressive strength tests in 2 inch cubes containing fiber in amounts of 7% and 10% by weight of the plaster used yielded the following results:

| Cube number— | Compressive strengths | |
|---|---|---|
| | 7% fiber | 10% fiber |
| | Lbs./sq. in. | Lbs./sq. in. |
| 1 | 1,100 | 1,000 |
| 2 | 950 | 1,025 |
| 3 | 1,125 | 1,100 |
| 4 | 1,045 | 1,025 |
| Average | 1,045 | 1,038 |

These cubes were made by mixing 7 parts fiber and 10 parts fiber, respectively, by weight, with 100 parts dry plaster, mixing into a slurry with from 50 to 60 parts of water and casting into standard 2 inch cubical molds. They were stored and broken at the end of eight days in accordance with American Society for Testing Materials specifications for gypsum plasters.

The behavior of the cubes during compression and the nature of the cubes after "failing" are of particular interest. When the cubes were first put under pressure the unit stress soon rose to about 500 pounds per square inch. At that point the cube began to absorb the stress by flattening very slightly but to such an extent that the unit pressure exerted by the machine was not increased. Finally, when the cube had shortened by about $\frac{1}{16}$ inch the unit pressure mounted rapidly to the point of "failure." This point of "failure" was not marked by any great visible breaking down of the cube but merely by a decrease in the unit pressure. Finally, when the pressure was released, the cube expanded back to within less than $\frac{1}{64}$ inch of its original size.

Even after having reached the "point of failure" in the compression test the cubes were far from being broken. Surface cracks appeared but the cube remained very definitely intact. Vigorous pounding with a hammer was required to shatter the cubes completely.

Test pieces 4" x 5" x ½" have been made which have a smooth hard surface and which exhibit many of the properties of wood. For example, a test piece containing 10% fiber required repeated dropping from a height of four feet onto a cement floor before even minute cracks began to appear on the surface. With further dropping the test piece did not shatter and fall to pieces, but was held firmly together by the fiber incorporated in the mass. Nails were driven into test pieces of from ½ inch to 1 inch in thickness and containing from 5% to 15% fiber without the appearance of even incipient cracks. Test pieces of the same size but made from plaster containing less than 5% fiber were much more readily shattered when dropped once onto a cement floor from a height of four feet; they were also badly cracked and broken when attempts were made to drive a nail into them.

Large boards and slabs up to 18" wide by 6' long and from ½" to 1" in thickness have been made. These boards are quite strong and are easily handled without breaking. A slab 8" x 24" x 1" when supported on bricks at each end easily supported a 100 pound weight set in the middle of the board.

Still another type of pre-cast product has been made by mixing the fiber with plaster to which has been added a minimum amount of water, placing the mass in a mold and subjecting it to pressure until it sets. Best results were obtained when the amount of water used was 20% of the weight of the plaster (15% is the theoretical amount required for hydration). The board thus produced is dense, very hard and strong and has very low water absorption. The set mass is quite crystalline, resembling crystalline limestone or marble in texture. The board is more resistant to shock than those made without pressure.

It is obvious that those skilled in the art may vary the ingredients and combinations of ingredients constituting the product, as well as vary the steps and combinations of steps constituting the process, without departing from the spirit of this invention and therefore it is desired not to be limited to the exact foregoing disclosure except as may be required by the claims.

What is claimed is:

1. The process of making fiber reinforced plaster products which comprises cooking gypsum in a concentrated magnesium sulfate solution at a temperature greater than 100° C.; filtering and washing the resultant plaster from the solution to remove the soluble salts; adding fiber to the thus produced damp plaster; and molding the fibered mass into desired shapes, the plaster during said filtering, washing, and addition of the fiber being maintained at a temperature sufficiently high to prevent its setting prior to its molding.

2. The process of making fiber reinforced plaster products which comprises cooking gypsum in a concentrated magnesium sulfate solution at a temperature greater than 100° C.; filtering and washing the resultant plaster from the solution to remove the soluble salts; incorporating fiber throughout the thus produced damp plaster; and molding the fibered mass into desired shapes, the plaster during said filtering, washing, and addition of the fiber being maintained at a temperature sufficiently high to prevent its setting prior to its molding.

3. The process of making fiber reinforced plaster products which comprises cooking gypsum in a concentrated magnesium sulfate solution at a temperature greater than 100° C.; filtering and washing the resultant plaster from the solution to remove the soluble salts; adding fiber to the thus produced damp plaster; molding the fibered mass into desired shapes, the plaster during said filtering, washing, and addition of the fiber being maintained at a temperature sufficiently high to prevent its setting prior to its molding; and hydrating the shaped mass under pressure.

4. The process of making fiber reinforced plaster products which comprises cooking gypsum in a concentrated magnesium sulfate solution; filtering and washing the resultant plaster from the solution to remove the soluble salts; adding fiber to the thus produced damp plaster; and molding the fibered mass into desired shapes, the plaster during said filtering, washing, and addition of the fiber being maintained at a temperature of at least 80° C. to prevent its setting prior to its molding.

5. The process of making plaster products which comprises cooking gypsum in a concentrated magnesium sulfate solution at a temperature greater than 100° C.; filtering and washing the resultant plaster from the solution to remove the soluble salts; and molding the thus produced damp plaster into desired shapes, the plaster during said filtering and washing being maintained at a temperature sufficiently high to prevent its setting prior to its molding.

6. The process of making plaster products which comprises cooking gypsum in a concentrated magnesium sulfate solution; filtering and washing the resultant plaster from the solution to remove the soluble salts; and molding the thus produced damp plaster into desired shapes, the plaster during said filtering and washing being maintained at a temperature of at least 80° C. to prevent its setting prior to its molding.

7. The process of making fiber reinforced plaster products which comprises cooking gypsum in a concentrated magnesium sulfate solution at a temperature greater than 100° C.; filtering and washing the resultant plaster from the solution to remove the soluble salts; adding fiber to the thus produced damp plaster; and molding the fibered mass into desired shapes, the plaster during said filtering, washing, and addition of the fiber being maintained at a temperature of at least 80° C. to prevent its setting prior to its molding.

8. The process of making plaster products which comprises cooking gypsum in a concentrated magnesium sulfate solution; filtering and washing the resultant plaster from the solution to remove the soluble salts; and molding the thus produced damp plaster into desired shapes, the plaster during said filtering and washing being maintained at a temperature sufficiently high to prevent its setting prior to its molding.

EUGENE P. SCHOCH.
WILLIAM A. CUNNINGHAM.